(12) United States Patent
Dillenberger et al.

(10) Patent No.: US 7,003,772 B2
(45) Date of Patent: Feb. 21, 2006

(54) POLICY MANAGEMENT FOR DISTRIBUTED COMPUTING AND A METHOD FOR AGING STATISTICS

(75) Inventors: Donna N. Dillenberger, Yorktown Heights, NY (US); Mark Francis Hulber, Citrus Heights, CA (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 09/729,371

(22) Filed: Dec. 4, 2000

(65) Prior Publication Data

US 2002/0069281 A1    Jun. 6, 2002

(51) Int. Cl.
    *G06F 9/46*    (2006.01)
(52) U.S. Cl. ...................... 718/104; 709/226
(58) Field of Classification Search ............... 718/105, 718/104; 395/184; 709/226
    See application file for complete search history.

(56) References Cited

U.S. PATENT DOCUMENTS 5,459,837 A * 10/1995 Caccavale .................. 709/226
5,819,033 A * 10/1998 Caccavale .................. 709/224
6,026,425 A *  2/2000 Suguri et al. ............... 718/105

* cited by examiner

*Primary Examiner*—Meng-Al T. An
*Assistant Examiner*—Camquy Truong
(74) *Attorney, Agent, or Firm*—Ohlandt, Greeley, Ruggiero & Perle, L.L.P.; Daniel P. Morris, Esq.

(57) ABSTRACT

A policy management system and method having a plurality of cooperating computers connected in a network. A policy management software resident in one or more managing computers of the network monitors the network and collects performance related values, such as, response time or queue delay of the cooperating computers. Performance related metrics are derived from the performance values and posted for access by the software that distributes work or controls execution of the work. The performance metrics includes only a number and average of the values received. The performance related values are formed in a data structure having n rows, where n is the number of value reporting intervals for which the performance metrics are kept. As a new current interval begins, the performance metrics of the nth row of a preceding interval are discarded and such nth row is used as the first row for the current interval. The remaining rows are shifted down one row position.

52 Claims, 6 Drawing Sheets

| Time Period\Attribute | Attribute Name | Number of Values | Average of Values |
|---|---|---|---|
| Current Interval 100 | Response Time | 7 | 160ms |
| Previous Interval 102 | Response Time | 26 | 178ms |
| Interval x 2 104 | Response Time | 41 | 175ms |
| Interval x 3 106 | Response Time | 75 | 184ms |

Fig. 5

POLICY MANAGEMENT FOR DISTRIBUTED COMPUTING AND A METHOD FOR AGING STATISTICS

FIELD OF INVENTION

This invention relates to a system and method for managing policy decisions for a network of cooperating computers and to a method for aging statistics.

BACKGROUND OF INVENTION

Prior art methods that implement policy for computer systems that are homogenous in architecture assigned work on a platform specific basis or an operating system basis. For example, the IBM S/390 workload manager uses 390 system platform specific statistics, such as, multi-programming level, virtual storage, expanded storage, to make decisions on where to place work. Prior art methods of policy management have required advance knowledge of how much CPU time or memory an application needs to run to efficiently assign the application in a cluster of computers and take advantage of the cluster resources. Prior art methods of policy management also have created an affinity between certain types of work and a specific computer.

Statistics used by prior art policy management methods have been updated on a periodic basis, whether or not new values have been received. This updating has been scheduled by a timer that signals the update times. This causes additional path length, CPU cycles and concerns about recovery, such as, failure of the timer to signal.

With the advent of computer networks and the distribution of work among the computers, there is a need for a policy manager that can manage policy independent of the architecture of the computers connected in the network.

There is also a need for a method and system for aging statistics that are used in the policy management process.

SUMMARY OF INVENTION

The present invention satisfies the aforementioned needs with a policy management system and method that manages the availability of a plurality of cooperating computers connected in a network to do work. The method identifies a set of specific ones of the plurality of cooperating computers as available resources for the performance of the work. Performance metrics are derived from performance related values of the plurality of cooperating computers. Based on the performance metrics, the set of specific ones of the cooperating computers are changed to thereby enable the allocation of work to cooperating computers that, from a performance standpoint, can do the work in the shortest possible time.

The system and method of the invention can be used with cooperating computers that are either homogenous or heterogeneous in architecture or that employ the same or diverse operating systems. The performance related metrics, for example, include response times or queue delays of a cooperating computer.

The system and method of policy management is flexible to allow as much policy management as desired to be delegated from a system policy manager to a local or cluster manager. The method may request a manager of a cluster to accept additional work or to give up pending work based on the performance related metrics or to start more work or to run more pieces of an application on one or more of the cooperating computers of the cluster.

According to an aspect of the present invention, the performance metrics are derived or updated only when a new value has been received or a request has been made to view the data. This saves CPU cycles that were used in prior methods that performed updates periodically, whether or not new values had been received since the last update.

According to another aspect of the invention, the performance related values are received over a series of time intervals. The performance metrics are derived for n periods, of which the performance metrics of the nth period thereof includes an aggregate of the performance metrics for the current interval plus n−1 of the preceding time intervals. The performance metrics of the nth or last period of a preceding interval are discarded during a current interval.

The performance metrics are formed as a data structure having n rows that contain the performance metrics of the n periods. The performance metrics of the nth row of a preceding interval are discarded during a current interval. The nth row of the preceding interval is used as a first row in the current interval and the remaining rows are shifted down one row position.

According to a further aspect of the present invention, each of the performance metrics includes only a number and average of values received.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIG. 5 depicts a data structure of the performance metrics formed by the process of FIG. 4;

DESCRIPTION OF THE PREFERRED EMBODIMENT

Figure 1:
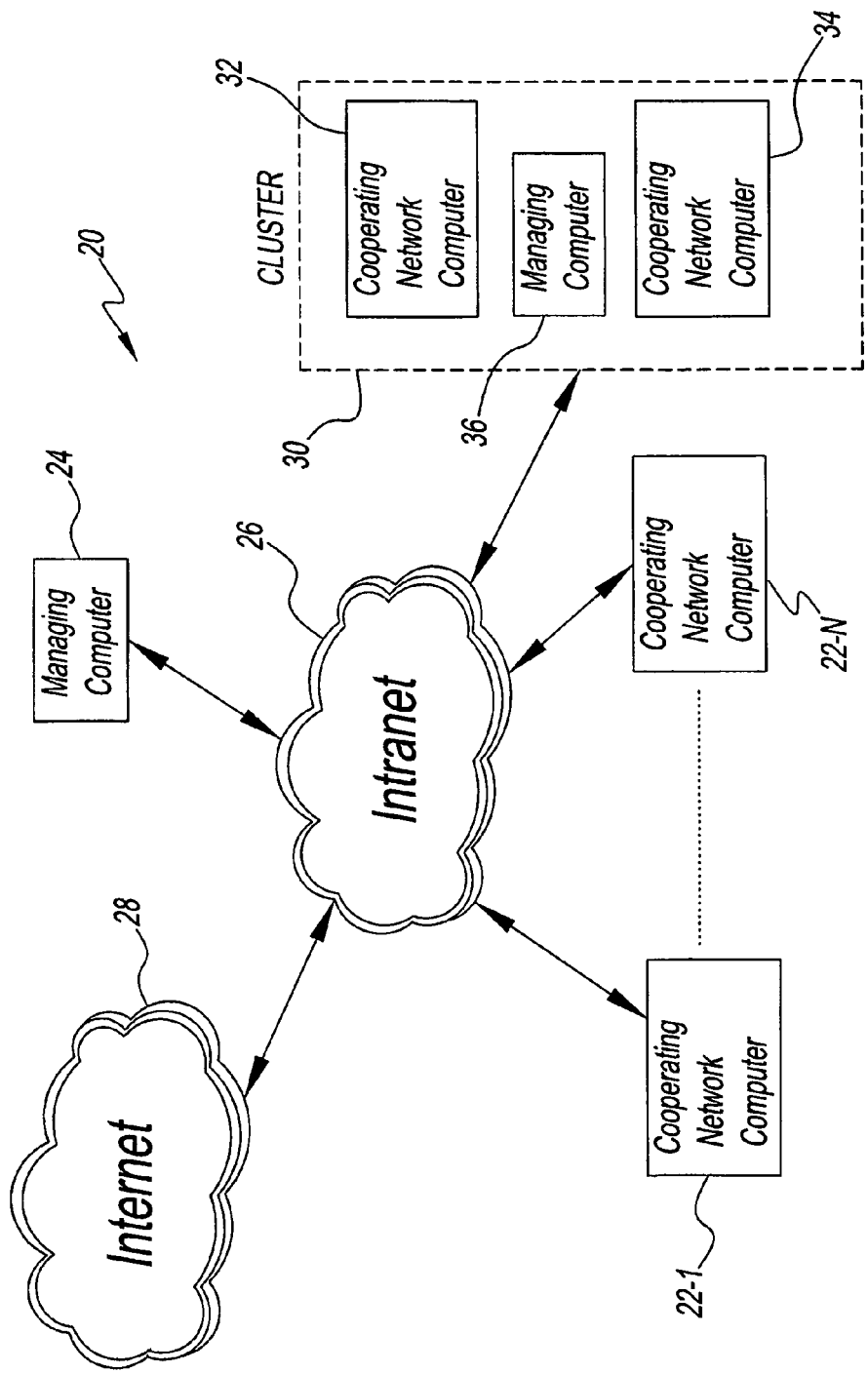
FIG. 1 is a block diagram of a system in which the policy management system and method the present invention is employed.

Referring to FIG. 1, a distributed computing system 20 includes a plurality of cooperating network computers 22-1 through 22-N, a managing computer 24, an intranet 26, an internet 28 and a cluster 30. Intranet 26 interconnects cooperating network computers 22-1 through 22-N, cluster 30 and managing computer 24 in a distributing computing network. Intranet 26 is generally a network that is internal to an organization. The present invention contemplates that other computers outside the organization may be included in the distributed computing network. To this end, internet 28 serves to interconnect these other computers (not shown) with managing computer 24, cluster 30 and cooperating network computers 22-1 through 22-N. Other non-network computers (not shown) can also communicate with system 20 via internet 28.

Cluster 30 includes a managing computer 36 and two cooperating network computers 32 and 34. Cooperating network computers 32 and 34 and managing computer 36 are each connected with intranet 26. Cluster 30 may be considered a node in system 20. Although two cooperating network computers 32 and 34 are shown, it will be apparent to those skilled in the art that cluster 30 may include more or less cooperating computers. It will also be apparent to those skilled in the art that system 20 may include additional clusters.

Managing computer 24 manages the policy concerning allocation of work (applications) and distribution of that work among cooperating computers 22-1 through 22-N and cluster 30. Managing computer 36 manages the policy and distribution of work among cooperating network computers 32 and 34. It will be apparent to those skilled in the art that managing computers 24 and 26 are shown as single computers by way of example and that policy management and work distribution may be functionally distributed among two or more computers.

Figure 2:
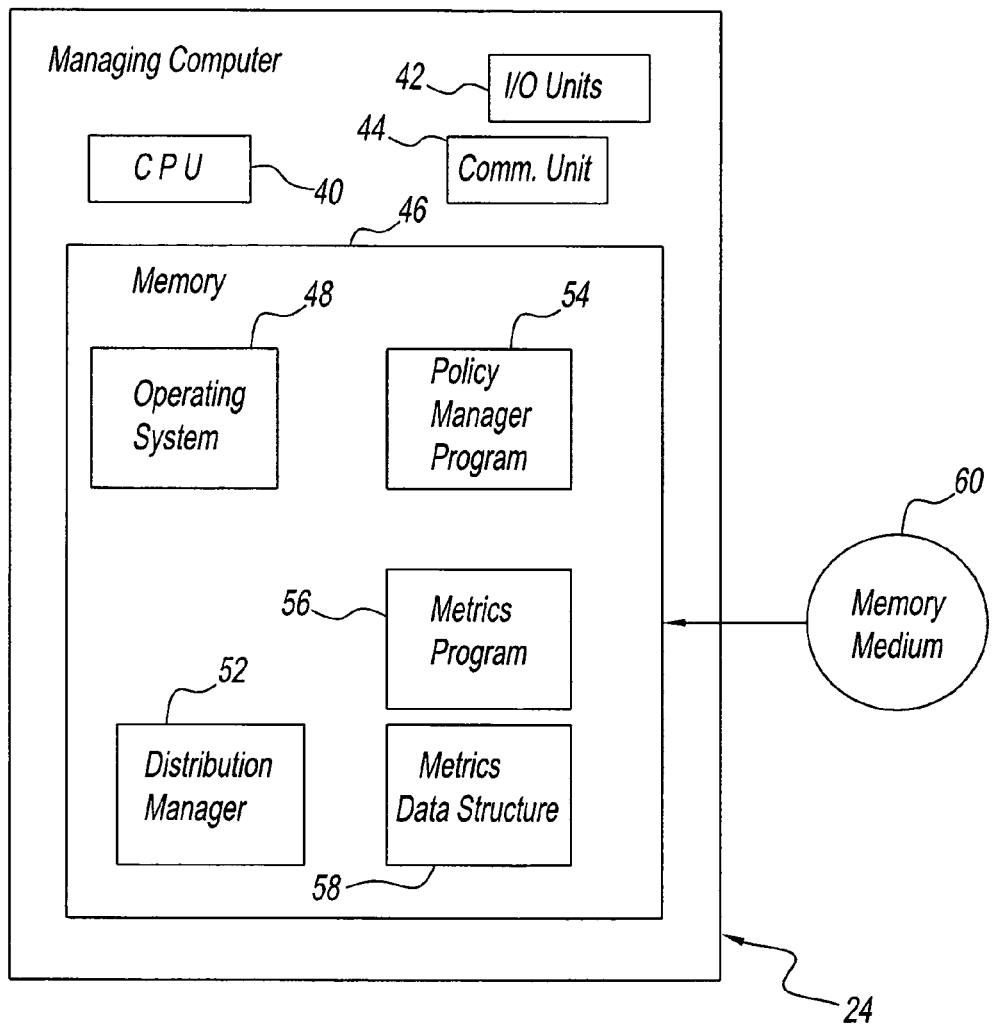
FIG. 2 is a block diagram of the managing computer of the FIG. 1 system.

Referring to FIG. 2, managing computer 24 includes a central processing unit (CPU) 40, an input/output (I/O) units section 42, a communications unit 44 and a memory 46. Communications unit 44 serves to interconnect managing computer with intranet 26 for communication with cooperating computers 22-1 through 22-N and cluster 30. Memory 46 includes an operating system program 48, a distribution manager program 52, a policy manager program 54, a metrics program 56 and a metrics data structure 58.

Policy manager program 54 and metrics program 56 control CPU 40 to develop and update metrics data structure 58 with performance related metrics of cooperating network computers 32, 34 and 22-1 through 22-N. Distribution manager 52 uses metrics data structure 58 to control CPU 40 to distribute work among cooperating network computers 32, 34 and 22-1 through 22-N. Dependent on the allocation of policy management responsibility among managing computer 24 and managing computer 36, managing computer 36 may also have access to metrics data structure 58. It will be apparent to those skilled in the art that although metrics program 56 and metrics data structure 58 are shown as separate modules, each could be incorporated into policy manager program 54. It will be apparent to those skilled in the art that managing computer 36 may have the same or similar structure and software as managing computer 24.

Software stored in memory 46, including policy manager program 54, metrics program 56 may be loaded or down loaded from a memory medium 60 to memory 46.

Figure 3:
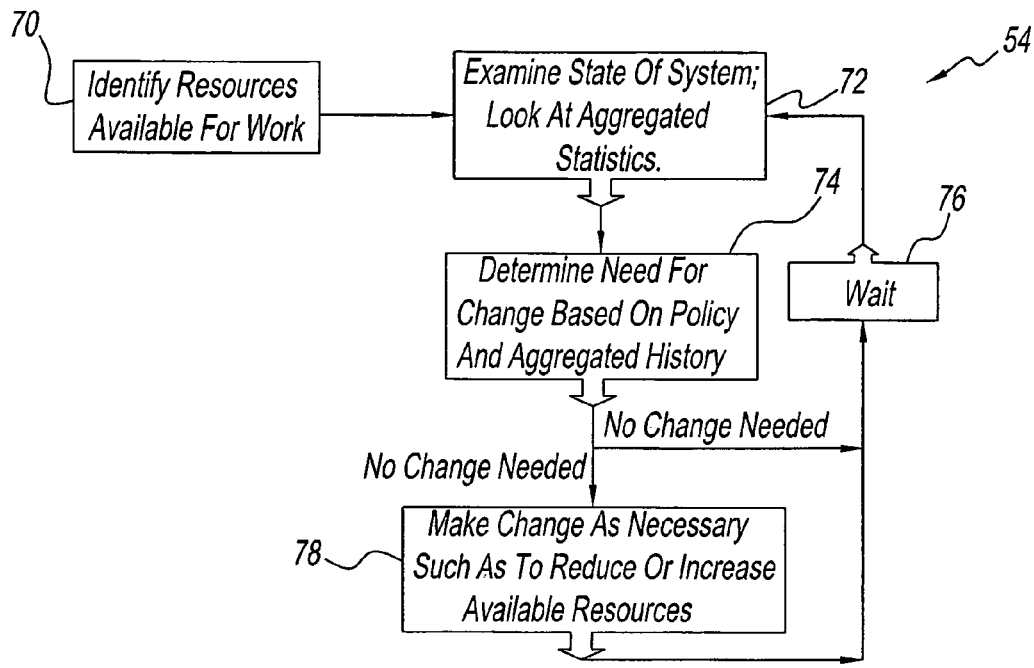
FIG. 3 is a flow diagram of the policy manager program of the FIG. 2 managing computer.

Referring to FIG. 3, policy manager program 54 at step 70 identifies a set of resources that are available for work. For example, the specific ones of cooperating network computers 32, 34 or 22-1 through 22-N that are available for work are identified. This identification is available for access by distribution manager program 52. Step 72 examines the state of system 20 including metrics data structure 58. Step 74 determines if there is any need to change the available resources based on the metrics data structure 58. If no change is needed, step 76 causes policy manager program 54 to wait and then step 72 is repeated. If step 74 determines there is a need for change, step 78 either increases or decreases the current set of available resources. After step 78 is completed, step 76 causes policy manager program 54 to wait and then step 72 is repeated.

Figure 4:
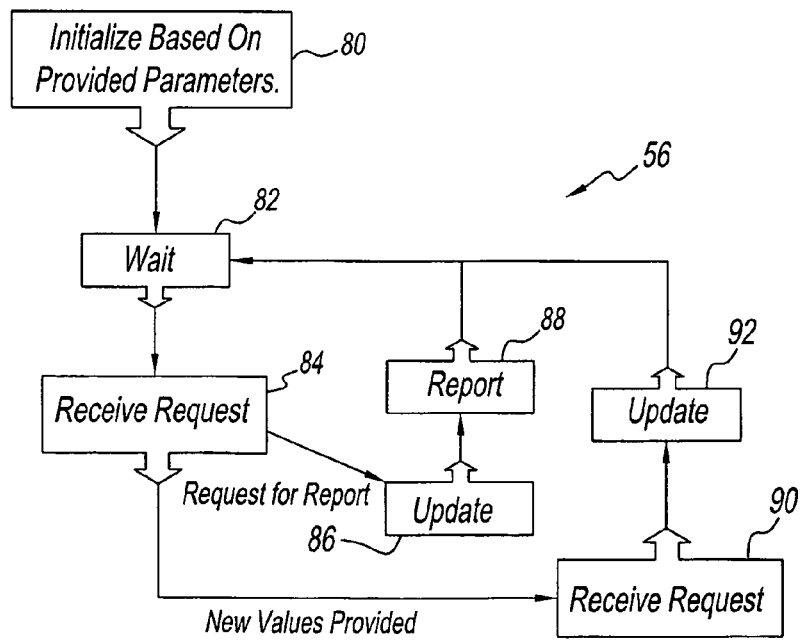
FIG. 4 is a flow diagram of the performance values and metrics formation process of the FIG. 2 managing computer.

Referring to FIG. 4, metrics program 56 starts with step 80 that initializes based on provided parameters, such as, the location of basic components. Step 82 then causes metrics program 56 to wait until a request is received. If the request is for a report, the metrics contained in metric data structure 58 are updated by step 86. Step 88 then issues the requested report and control returns to step 82. If the request is to provide new values, step 90 derives the metrics from the new values. The derived metrics are then used by step 92 to update metric data structure 58. Control is then passed to step 82. Metrics program 56 performs the foregoing steps for each cooperating network computer that is connected in system 20, unless managing computer 36 is responsible to track the performance related values of cooperating network computers 32 and 34.

Referring to FIG. 5, metrics data structure 58 is shown in the form of a table having rows 100, 102, 104 and 106. Rows 100, 102, 104 and 106 each contain a performance related metric for a different value reporting interval. According to one aspect of the invention, the performance related value may be either the response time or queue delay of a cooperating network computer. In FIG. 5, the performance related value is shown as response time. The derived metrics in each row consist of a number of values received for that reporting interval and an average of the reported values. Thus, row 100 is shown with a total number of 7 values received thus far in a current reporting interval with an average response time of 160 milliseconds (ms). Thus, only two metrics are needed for each reporting interval. Row 102 has a reporting interval that consists of the previous interval plus the current interval. Row 104 has a reporting interval of the two previous intervals plus the current interval. Row 206 has a reporting interval of the three preceding intervals plus the current interval. It will be apparent to those skilled in the art that there can be more or less rows than the four rows 100, 102, 104 and 106.

Figure 6:
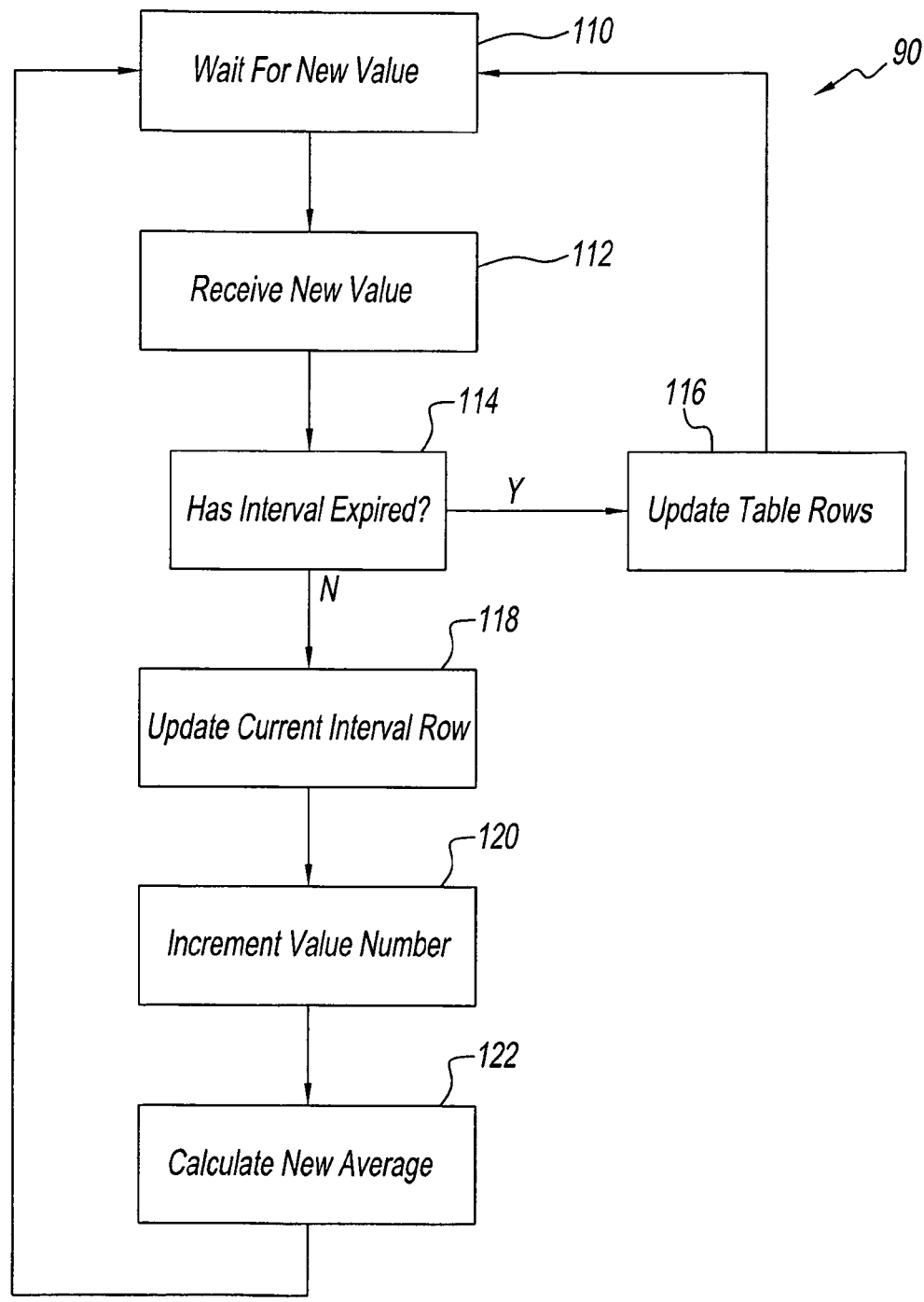
FIG. 6 is a flow diagram of the receive new values portion of the flow diagram of FIG. 4.

Referring to FIG. 6, aggregate values step 90 of FIG. 4 is shown in detail. Step 110 waits for a new value. Step 112 receives a new value. Step 114 determines if the current value reporting interval has expired. If so, step 116 updates rows 100, 102, 104 and 106 of metrics data structure 58 and passes control to step 110. If not, step 118 updates only the current row 100. By updating only the current row as each new value is received, computation time is conserved. Step 120 increments the values number and step 122 calculates a new average. For example, the new average is the old average plus the difference of the current value and the old average divided by the new number of values. After step 122, control is passed to step 110.

Figure 7:
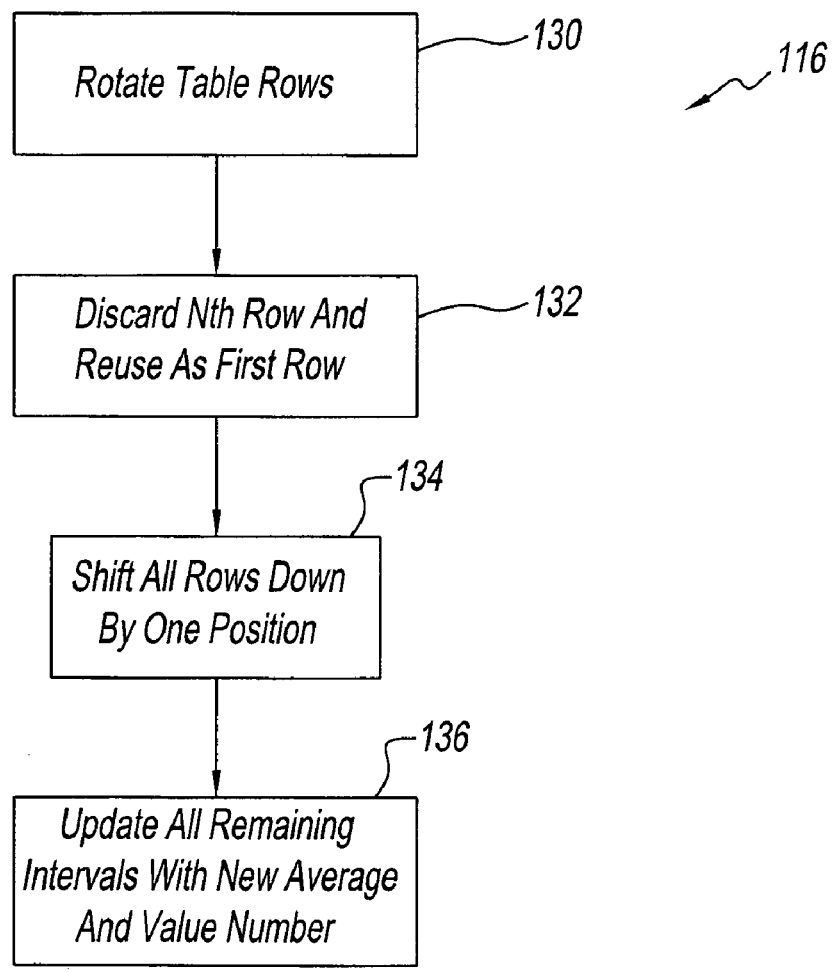
FIG. 7 is a flow diagram of the update table portion of the flow diagram of FIG. 4.

Referring to FIG. 7, update table rows step 116 of FIG. 6 is shown in detail. Step 130 rotates table rows 100, 102, 104 and 106 of metrics data structure 58 of FIG. 5. Step 132 discards the metrics contained in the nth row, which is row 106 in FIG. 5. Row 106 is then used as the first row for the metrics to be derived in the next current interval. Step 134 then shifts all remaining rows down one position. Thus, for the next current interval, row 106 will contain the metrics for the current interval. Row 100 will contain the metrics for the previous interval plus that current interval. Row 102 will contain the metrics for the two previous intervals plus the current interval. Row 104 will contain the metrics for the three previous intervals plus the current interval.

Policy manager program 54 runs independently of distribution and execution of work within system 20. That is, the process of policy management is disconnected from the active work processes that are being managed. This has the effect of reducing overhead of system 20, thereby allowing for maximum scalability. Policy manager program 54 contains no process that establishes an affinity between a specific work item or type of work and a specific cooperating network computer.

Policy manager program 54 oversees system 20 and the work execution process without interfering with the production cycles of system 20. This is accomplished by having policy manager program 54 run separately from distribution manager program 52 and other software that controls execution of work by system 20. This allows policy manager program to monitor the execution of work and to extract decision making information, such as performance related values, while minimally impacting the ongoing work process.

Policy manager program 54 and managing computer 24 are a central policy manager that monitors system 20. In order to achieve fault tolerance as well as limit the load on any one policy manager, managing computer 24 can communicate with a plurality of local or cluster policy managers, such as, managing computer 36, throughout system 20. The task of each local managing computer is to enforce local policy, while meeting the goals of the global system through communication with other local policy managers and the central managing computer 24. Each cluster policy manager keeps track of the current policy and state of its cluster. By managing policy local to a cluster, the bottleneck of funneling all local policy decisions through a single central policy manager is avoided. Clusters, such as cluster 30, can be partitioned based on functionality, proximity or any arbitrary consideration.

The policy management system and method of the present invention allows for more than one method for handling the distribution of policy management among managing computer 24 and cluster managing computers, such as, managing computer 36. In one aspect, managing computer 24 can view cluster 30 as a single node and have no knowledge of cooperating network computers 32 and 34. In another aspect of the invention, managing computer 24 must approve of all decisions made by managing computer 36 and, thus, has first hand knowledge of system 20. A combination of these two aspects allows the cluster managing computer 36 to make local decisions about its resource management, while central managing computer 24, as needed, has access to the state of cluster 30 and cooperating network computers 32 and 34.

The present invention having been thus described with particular reference to the preferred forms thereof, it will be obvious that various changes and modifications may be made therein without departing from the spirit and scope of the present invention as defined in the appended claims.

What is claimed is:

1. A method comprising:
   managing the availability to do work of a plurality of cooperating computers connected in a network by:
   (a) identifying a set of specific ones of said plurality of cooperating computers as available resources for the performance of said work;
   (b) receiving performance related values of said plurality of cooperating computers;
   (c) deriving performance related metrics from said performance related values; and
   (d) changing said set of specific ones of said plurality of cooperating computers based on said performance related metrics;
   wherein step (b) receives said performance related values over a series of time intervals, and wherein step (c) derives said performance metrics for n periods of each of said intervals, of which the performance metrics of the nth period thereof includes an aggregate of the performance metrics for a current interval plus n−1 of the preceding intervals.

2. The method of claim 1, wherein at least one of said plurality of cooperating computers is heterogeneous with respect to the other cooperating computers of said plurality of cooperating computers.

3. The method of claim 1, wherein step (d) adds additional ones of said plurality of cooperating computers to said set or deletes one or more of said specific ones of said plurality of cooperating computers from said set.

4. The method of claim 1, wherein step (d) changes said set independently of any architecture or operating system specific metrics of said plurality of cooperating computers.

5. The method of claim 1, wherein step (d) changes said set independently of any workload specific metrics of said plurality of cooperating computers.

6. The method of claim 1, wherein said performance values are selected from the group consisting of: response times and queue delays.

7. The method of claim 1, wherein a cluster of said plurality of cooperating computers is connected to a node contained in said network, further comprising (e) requesting a manager of said cluster to accept additional work or to give up pending work based on said performance related metrics.

8. The method of claim 7, further comprising (f) requesting said manager of said cluster to start more work or to run more pieces of an application on one or more of the cooperating computers of said cluster.

9. The method of claim 1, wherein step (a) identifies said set at a first time based on said performance related metrics, and wherein step (d) changes said set at a second later time.

10. The method of claim 1, wherein step (d) is performed only when a new value has been received or a request has been made to view the data.

11. The method of claim 1, wherein step (d) forms said performance metrics as an aggregation of said values.

12. The method of claim 11, wherein step (d) forms said performance metrics for each of said plurality of said cooperating computers.

13. The method of claim 12, wherein step (d) is performed only when a new one of said values is received or a request to view the performance metric is received.

14. The method of claim 1, wherein the performance metrics of the nth period of a preceding interval are discarded during a current interval.

15. The method of claim 14, wherein said performance metrics for each of said periods include only a number and average of values received.

16. The method of claim 1, wherein each of said performance metrics includes only a number and an average of values received.

17. The method of claim 1, wherein step (c) forms said performance metrics as a data structure having n rows that contain the performance metrics of said n periods, respectively, wherein the performance metrics of the nth row of a preceding interval are discarded during a current interval, and wherein said nth row of the preceding interval is used as a first row in the current interval and the remaining ones of said n rows are shifted down one row position.

18. A computer having a CPU and a memory comprising:
   policy program means for causing said CPU to mange the availability to do work of a plurality of cooperating computers that are connected in a network, said policy program means comprising:
   first means for performing a first operation that identifies a set of specific ones of said plurality of cooperating computers as available resources for the performance of work;

second means for performing a second operation that receives performance related values of said plurality of cooperating computers;

third means for performing a third operation that derives performance related metrics from said performance related values; and fourth means for performing a fourth operation that changes said set of specific ones of said plurality of cooperating computers based on said performance related metrics;

wherein said second operation receives said performance related values over a series of time intervals, and wherein said third operation derives said performance metrics for n periods of each of said intervals, of which the performance metrics of the nth period thereof includes an aggregate of the performance metrics for a current interval plus n−1 of the preceding intervals.

19. The computer of claim 18, wherein at least one of said plurality of cooperating computers is heterogeneous with respect to the other cooperating computers of said plurality of cooperating computers.

20. The computer of claim 18, wherein said fourth operation adds additional ones of said plurality of cooperating computers to said set or deletes one or more of said specific ones of said plurality of cooperating computers from said set.

21. The computer of claim 18, wherein said fourth operation changes said set independently of any architecture or operating system specific metrics of said plurality of cooperating computers.

22. The computer of claim 18, wherein said fourth operation changes said set independently of any workload specific metrics of said plurality of cooperating computers.

23. The computer of claim 18, wherein said performance values are selected from the group consisting of: response times and queue delays.

24. The computer of claim 18, wherein a cluster of said plurality of cooperating computers is connected to a node contained in said network, further comprising a fifth means for performing a fifth operation that requests a manager of said cluster to accept additional work or to give up pending work based on said performance related metrics.

25. The computer of claim 24, further comprising sixth means for performing a sixth operation that requests said manager of said cluster to start more work or to run more pieces of an application on one or more of the cooperating computers of said cluster.

26. The computer of claim 18, wherein said first operation identifies said set at a first time based on said performance related metrics, and wherein said fourth changes said set at a second later time.

27. The computer of claim 18, wherein said fourth operation is performed only when a new value has been received or a request has been made to view the data.

28. The computer of claim 18, wherein said fourth operation forms said performance metrics as an aggregation of said values.

29. The computer of claim 28, wherein said fourth operation forms said performance metrics for each of said plurality of said cooperating computers.

30. The computer of claim 29, wherein said fourth operation is performed only when a new one of said values is received or a request to view the performance metric is received.

31. The computer of claim 18, wherein the performance metrics of the nth period of a preceding interval are discarded during a current interval.

32. The computer of claim 31, wherein said performance metrics for each of said periods include only a number and average of values received.

33. The computer of claim 18, wherein each of said performance metrics includes only a number and an average of values received.

34. The computer of claim 18, wherein said third operation forms said performance metrics as a data structure having n rows that contain the performance metrics of said n periods, respectively, wherein the performance metrics of the nth row of a preceding interval are discarded during a current interval, and wherein said nth row of the preceding interval is used as a first row in the current interval and the remaining ones of said n rows are shifted down one row position.

35. A memory medium for controlling a computer, said memory medium comprising:

a policy manager program that controls said computer to manage the availability to do work of a plurality of cooperating computers connected in a network, said policy manager program comprising program instructions:

for controlling said computer to perform a first operation that identifies a set of specific ones of said plurality of cooperating computers as available resources for the performance of work;

for controlling said computer to perform a second operation that receives performance related values of said plurality of cooperating computers;

for controlling said computer to perform a third operation that derives performance related metrics from said performance related values; and for controlling said computer to perform a fourth operation that changes said set of specific ones of said plurality of cooperating computers based on said performance related metrics;

wherein second operation receives said performance related values over a series of time intervals, and wherein said third operation derives said performance metrics for n periods of each of said intervals, of which the performance metrics of the nth period thereof includes an aggregate of the performance metrics for a current interval plus n−1 of the preceding intervals.

36. The memory medium of claim 35, wherein at least one of said plurality of cooperating computers is heterogeneous with respect to the other cooperating computers of said plurality of cooperating computers.

37. The memory medium of claim 35, wherein said fourth operation adds additional ones of said plurality of cooperating computers to said set or deletes one or more of said specific ones of said plurality of cooperating computers from said set.

38. The memory medium of claim 35, wherein said fourth operation changes said set independently of any architecture or operating system specific metrics of said plurality of cooperating computers.

39. The memory medium of claim 35, wherein said fourth operation changes said set independently of any workload specific metrics of said plurality of cooperating computers.

40. The memory medium of claim 35, wherein said performance values are selected from the group consisting of: response times and queue delays.

41. The memory medium of claim 35, wherein a cluster of said plurality of cooperating computers is connected to a node contained in said network, wherein said program instructions further control said computer to perform a fifth operation that requests a manager of said cluster to accept additional work or to give up pending work based on said performance related metrics.

42. The memory medium of claim 41, wherein said program instructions further control said computer to perform a sixth operation that requests said manager of said cluster to start more work or to run more pieces of an application on one or more of the cooperating computers of said cluster.

43. The memory medium of claim 35, wherein said first operation identifies said set at a first time based on said performance related metrics, and wherein step (d) changes said set at a second later time.

44. The memory medium of claim 35, wherein said fourth operation is performed only when a new value has been received or a request has been made to view the data.

45. The memory medium of claim 35, wherein said fourth operation forms said performance metrics as an aggregation of said values.

46. The memory medium of claim 45, wherein said fourth operation forms said performance metrics for each of said plurality of said cooperating computers.

47. The memory medium of claim 46, wherein said fourth operation is performed only when a new one of said values is received or a request to view the performance metric is received.

48. The memory medium of claim 35, wherein the performance metrics of the nth period of a preceding interval are discarded during a current interval.

49. The memory medium of claim 48, wherein said performance metrics for each of said periods include only a number and average of values received.

50. The memory medium of claim 35, wherein each of said performance metrics includes only a number and an average of values received.

51. The memory medium of claim 35, wherein said third operation forms said performance metrics as a data structure having n rows that contain the performance metrics of said n periods, respectively, wherein the performance metrics of the nth row of a preceding interval are discarded during a current interval, and wherein said nth row of the preceding interval is used as a first row in the current interval and the remaining ones of said n rows are shifted down one row position.

52. A method comprising:

managing the availability to do work of a plurality of cooperating computers, which are connected in a network and which comprise a cluster of said cooperating computers connected to a node contained in said network, by:

(a) identifying a set of specific ones of said plurality of cooperating computers as available resources for the performance of said work;

(b) receiving performance related values of said plurality of cooperating computers;

(c) deriving performance related metrics from said performance related values;

(d) changing said set of specific ones of said plurality of cooperating computers based on said performance related metrics;

(e) requesting a manager of said cluster to accept additional work or to give up pending work based on said performance related metrics;

(f) requesting said manager of said cluster to start more work or to run more pieces of an application on one or more of the cooperating computers of said cluster; and wherein step (d) forms said performance metrics as an aggregation of said values for each of said cooperating computers, wherein step (b) receives said performance related values over a series of time intervals, and wherein step (C) derives said performance metrics for n periods of each of said intervals, of which the performance metrics of the nth period thereof includes an aggregate of the performance metrics for a current interval plus n--1 of the preceding intervals, wherein step (c) forms said performance metrics as a data structure having n rows that contain the performance metrics of said n periods, respectively, wherein the performance metrics of the nth row of a preceding interval are discarded during a current interval, and wherein said nth row of the preceding interval is used as a first row in the current interval and the remaining ones of said n rows are shifted down one row position.

* * * * *